July 29, 1941.  P. M. REA  2,250,813

MEANS FOR HERMETICALLY SEALING FLUID PRESSURE

Filed Aug. 17, 1937  2 Sheets-Sheet 1

Philip M. Rea
INVENTOR

BY Bernard P. Miller
ATTORNEY

July 29, 1941.                P. M. REA                2,250,813
         MEANS FOR HERMETICALLY SEALING FLUID PRESSURE
                Filed Aug. 17, 1937        2 Sheets-Sheet 2

Philip M. Rea
INVENTOR

BY Bernard P. Miller
ATTORNEY

Patented July 29, 1941

2,250,813

UNITED STATES PATENT OFFICE 2,250,813

MEANS FOR HERMETICALLY SEALING FLUID PRESSURE

Philip M. Rea, Oklahoma City, Okla.

Application August 17, 1937, Serial No. 159,498

11 Claims. (Cl. 251—159)

The invention relates to hydraulic mechanism, and more particularly to means in connection therewith for hermetically sealing between two elements through action of fluid pressures.

In hydraulics, it is common practice, at the present time, to utilize a resilient or pliant commodity such as rubber or similar composition in sealing against leakage between two elements. For instance, there are in use at the present time: rubber and rubber covered valve heads having conical, arcuate and flat sealing surfaces; rubber and rubber covered valve seats having similarly shaped sealing surfaces; and, rubber and rubber covered ball valves.

Such sealing elements have proven entirely satisfactory in sealing comparatively low fluid pressures, for instance, up to possibly one hundred pounds per square inch. However, when greater pressures are encountered it has been found that the rubber is compressed beyond its elastic limit and consequently fails to regain its original configuration, or in some structural designs the rubber is cut entirely through by impingement between the two mating elements. The prime object in at all using rubber in such hydraulic mechanisms is, of course, to reduce friction and wear between the two sealing surfaces.

It may readily be understood that when a valve head having a face of, for instance, nine square inches, is exposed to a line pressure of two hundred pounds per square inch, the valve seat is subjected to approximately eighteen hundred pounds pressure. If, in this instance, a rubber sealing element is interposed between the head and seat it must endure the eighteen hundred pounds pressure, and in addition it must endure the blow delivered by the head being moved into a seated position. If the seating surface was only three square inches in area, then the pressure which the rubber element would be called upon to withstand would be approximately six hundred pounds per square inch.

As far as I know or have been able to ascertain, there is at the present time no resilient sealing element for the above described uses which will withstand high fluid pressures, and consequently, the prime object of the present invention is the provision of such a sealing means.

In carrying out the invention, I provide one of the mating surfaces with deformations or projections which are surrounded or covered by a rubber or a similar resilient element. When high fluid pressure is exerted in a direction to force the mating surfaces together, the projections of one surface contact the face of the other, and the pressure then acts upon the resilient element to cause it to "flow" into a sealing engagement with both surfaces. The deformations act to both limit the proximity of the two surfaces and also to prevent the resilient element from "flowing" away from its supporting surface and through the flow line.

In a recent test a smooth metal ball covered with rubber was subjected to a line pressure of 3400 pounds per square inch while seated upon an annular tapered seat, arcuate transversely, 1¾ inches in diameter. The metal ball used was 1¾" in diameter with sufficient thickness of rubber covering to bring the outside diameter to 2¼ inches. The pressure was applied for less than one-half minute. No leak occurred, but upon removal, it was found the rubber covering had been cut through in one place and had been so badly grooved by contact with the seat that a permanent annular dent was present.

A similar ball of the same diameter but having a multiple of spaced projections, and covered with a similar thickness of the same rubber was then subjected to an instantaneous pressure of 7500 lbs. per sq. inch. No leak occurred and the rubber covering was not annularly dented by its contact with the seat. The same ball was then subjected to repeated 3 to 5 minute tests at from 3000 to 5000 lbs. per square inch pressure. The results were the same. The same ball was then subjected to 5000 lbs. pressure per sq. in. for 15 minutes and the pressure was then raised to 6500 lbs. and held for between 3 and 4 minutes. No leak occurred and only a slight impression was visible where the rubber contacted the valve seat.

Between each of the above tests, the ball was rotated so that it contacted the seat at different points. It was found that each time the pressure was applied, the deformations would be forced through the rubber covering, but apparently, when the pressure was again applied, the holes previously made were sealed by the pressure.

The same ball was then subjected to repeated 1 to 3 minute tests at from 2500 to 5000 lbs. pressure per square inch, being shifted upon its seat between each test, until the rubber cover was completely loosened upon the ball. No leak occurred, and the cover was not permanently grooved by its contact with the seat.

The description of the above tests has been set out herein in order to bring out the fact that when the pressure was applied, instead of the pressure acting to impinge the rubber covering between the ball and the seat, as in the first test, the pressure acted to "flow" the rubber along the surface of the ball and wedge it into its sealing engagement. This is the reason that no permanent indentation occurred. The tests also proved that the device will function whether or not the ends of the projections are covered by the rubber. In other words, the rubber could be built up only to a point even with the outer ends of the projections, and the result would be the same. The test also brought out the fact that it is not imperative that the cover be vulcanized to the ball core in order to function efficiently.

The present invention may be embodied in various forms of construction some of which are illustrated in the accompanying two-sheet drawings, wherein.

Like characters of reference indicate like parts in all of the figures.

Figure 1:
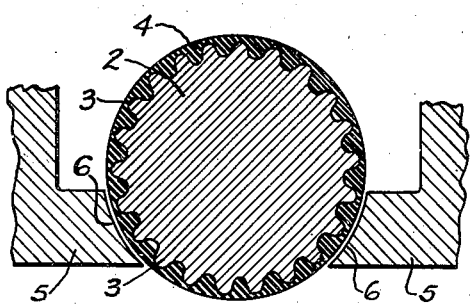
Figure 1 is a fragmentary vertical section through a seating element and showing in section a valve ball constructed in accordance with the invention.
Figure 2:
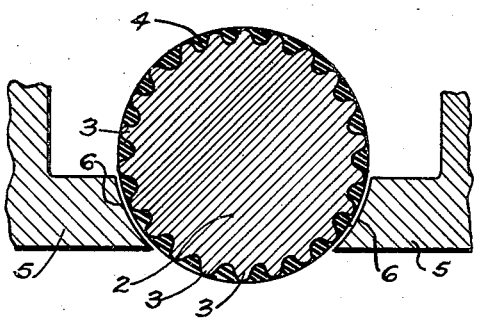
Figure 2 is a similar view showing the ball constructed in a slightly different manner.
Figure 3:
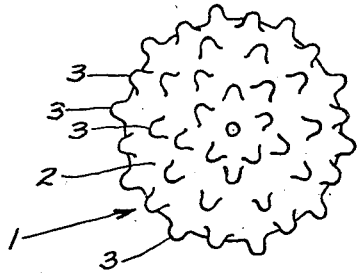
Figure 3 is an elevational view of the core of the balls shown in Figures 1 and 2.

Refer now more particularly to Figures 1, 2 and 3 wherein:

The reference numerals 1 indicate as a whole, a ball core consisting of a substantially spherical body 2 of rigid material. The body 2 is provided with a plurality of spaced projections 3 the outer ends of which describe a sphere, and which are preferably made integral with the body. A filler or cover 4 of suitable resilient material, such as rubber or rubber composition, is provided around the body 2 and occupies the space lying between the projections 3. In Figure 1, the cover 4 is shown as enveloping the free ends of the projections, while in Figure 2 the outer surface of the cover lies even with the ends of the projections.

In the embodiments shown in both Figures 1 and 2, a valve seat element 5 is provided which has an annular seating surface 6 for the ball. The sealing surface 6 is preferably arcuate transversly on a radius equal substantially to the radius of the outer ends of the projections, and the diameter of the seat is somewhat less than the exterior diameter of the ball.

In operation, the upper portion of the ball is subjected to fluid pressure forcing it toward the seat 6. The projections 3 contact the seat 6 and prevent contact of the core body with the seat which contact prevents impingement of the cover between the body and the seat. The fluid pressure causes the rubber of the cover to "flow" into a sealing engagement with the seat and body, while the projections tend to keep it from "flowing" off the body and through the seat opening. In the embodiment shown in Fig. 1, under high pressures the projections perforate the cover as the ball moves to its seated position, but this does not act to defeat proper sealing because upon each seating of the ball the previously made perforations are closed around the projections each time the pressure is applied.

Figure 4:
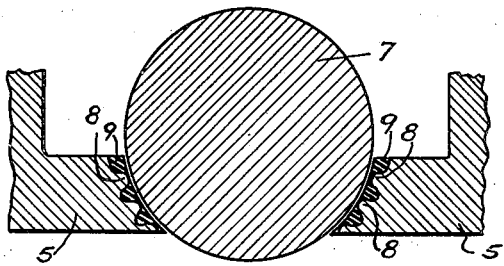
Figure 4 is a view similar to Figure 1, but showing a smooth surfaced rigid ball seated upon a valve seat embodying the invention.

In Figure 4 is illustrated an embodiment of the invention in which a smooth surfaced metal ball 7 is seated upon the seating element 5. In this embodiment, the seat portion of the element is equipped with a plurality of spaced deformations or projections 8 which are covered and surrounded by a filler 9.

In this embodiment, the upper surface of the filler is exposed to the fluid pressure and "flows" into its sealing engagement in a manner similar to the cover of Figs. 1 and 2. The projections 8 act to limit the proximity of the ball 7 and the body of the element 5 in a manner similar to that of the projections 3 of Figs. 1 and 2. This embodiment may be modified by having the ends of the projections 8 exposed through the exposed surface of the filler 9.

Figure 5:
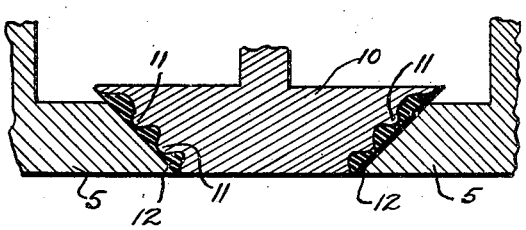
Figure 5 is a fragmentary vertical sectional view of a conical seating element and showing in section a conical valve head embodying the invention.
Figure 6:
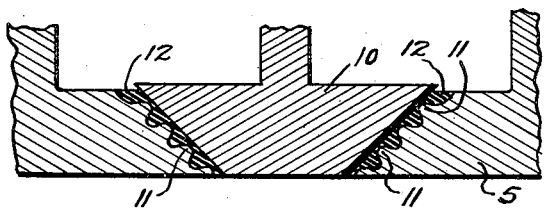
Figure 6 is a view similar to Figure 5 but showing the seating element embodying the invention.

In Figs. 5 and 6 are illustrated embodiments of the invention in which the seating element 5 is designed to accomodate a conical valve head. In Fig. 5 a valve head 10 is provided upon its sealing face with projections 11 and a resilient filler 12, while in Fig. 6, the projections and filler are carried by the seating element 5. It may be readily understood that in both of these embodiments the action of the projections and filler will be similar to their action described with reference to Figs. 1 and 4. In both instances the filler is exposed to the fluid pressure and is caused thereby to "flow" into its sealing engagement.

Figure 7:
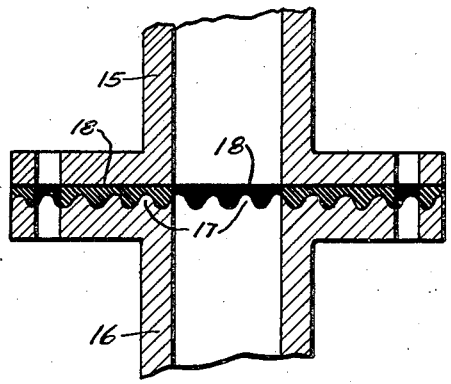
Figure 7 is a fragmentary vertical sectional view of two flanged pipe sections, the invention being embodied on the face of one of the flanges.

In Figure 7 is illustrated two flanged pipe sections 15 and 16, the section 16 being equipped with rigid spaced projections 17 and a resilient filler 18. When the flanges are bolted together, the projections are forced into contact with the adjacent face of the section 15 but insure against compressing the filler beyond its elastic limit. Pressure from the flow line acts to force the rubber into its sealing engagement with both flanges.

Figure 8:
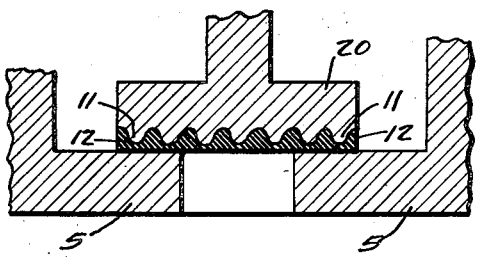
Figures 8 and 9 are views similar respectively to Figures 4 and 5 but disclosing a valve head and seat having flat complemental sealing surfaces.
Figure 9:
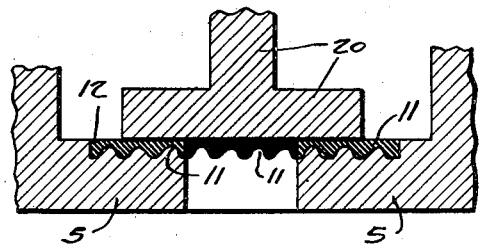

Figures 8 and 9 illustrate a flat type valve head 20 seated upon a valve element 5 having a flat type seat. These two embodiments are similar to the two embodiments respectively illustrated in Figs. 5 and 6 except that the flat type head and seat are provided instead of the conical type. The operation, it is thought, is obvious.

Figure 10:
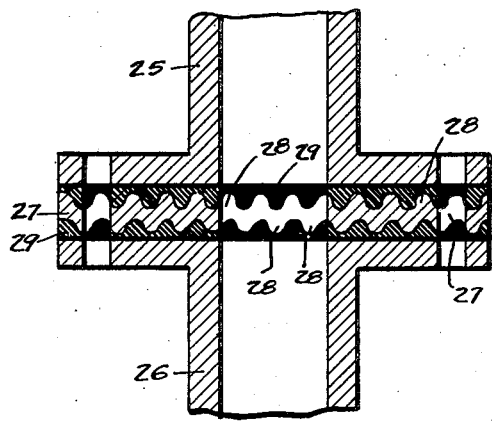
Figure 10 is a fragmentary vertical sectional view of two usual flanged pipe sections, the invention being disclosed there between in the form of a removable gasket; and, Figure 11 is a vertical sectional view of a valve ball constructed in a different manner from the balls of Figures 1 and 2, but one in which the inventive principle is retained.

Figure 10 illustrates an embodiment of the invention in which the inventive principle is utilized in the form of a gasket for sealing between adjacent faces of two usual flanged pipe sections 25 and 26. The gasket consists substantially of an annular metal core 27 having spaced rigid projections 28 on both of its faces. The projections are surrounded and, if desired, covered by a resilient filler 29. The action of this embodiment is similar to that of the embodiment shown in Fig. 7, except that in the gasket form the device may be removed at will.

Figure 11:
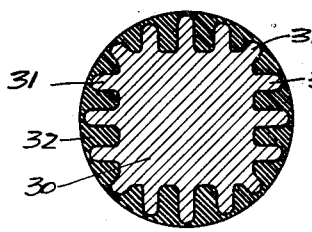

In the embodiments depicted in Figs. 1, 2 and 3, the core body of the valve ball is substantially spherical, and the free ends of the projections also describe a sphere. It is not imperative that the core body be spherical so long as the ends of the projections describe a sphere, and are not excessively long. In Fig. 11 is shown a ball formed with a cubical metal core body 30 having upon all faces spaced rigid projections 31 the outer ends of which describe a sphere, and a filler or cover 32 having its outer surface spherical.

A few ways in which the inventive principle may be utilized have been illustrated in the drawings and have been described hereinabove, but these embodiments merely illustrate preferred forms and are not, of course, the only ones in which the invention could be carried into use. For instance, the ball could have its core body constructed of many angular faces forming corners which would act in lieu of the projections illustrated, or the projections could be made in various shapes. I therefore reserve the right to all embodiments and forms of the invention and all possible uses thereof except as I am limited by the appended claims.

I claim:

1. A valve ball comprising, a spherical body of rigid material, spaced rigid projections carried by the body, said projections adapted to contact a valve seat for spacing the body from the seat, and a resilient cover for the body deformable by fluid pressure, said cover surrounding the projections and occupying the spaces therebetween.

2. Organization as described in claim 1, in which the cover envelopes the free ends of the projections when the ball is unseated.

3. A valve ball comprising, a body of rigid material, spaced rigid projections carried by the body and having their free ends describing a sphere, said projections adapted to contact a valve seat for limiting proximity of the body and seat, and a resilient cover for the body deformable by fluid pressure, said cover surrounding the projections, occupying the spaces therebetween, and having its exterior surface spherically formed.

4. In a valve structure, a valve head comprising a rigid body, spaced knobby protuberances carried by the body, a resilient filler surrounding the protuberances and occupying the spaces therebetween, and a seat having an orifice smaller in diameter than the diameter of the body together with its protuberances, said protuberances adapted to contact the seat when the body is in its closed position.

5. In a valve structure, a valve head comprising a rigid body, spaced knobby protuberances carried by the body, a resilient filler surrounding the protuberances and occupying the spaces therebetween, and a seat having an orifice smaller in diameter than the diameter of the body together with its protuberances, whereby the protuberances may contact the seat and prevent passage of the body through the orifice, and the filler may seal between the body and the seat through being deformed by fluid pressure.

6. In a valve structure, a housing, a rigid bodied valve head operably mounted therein, spaced knobby protuberances carried by the body of the head, a resilient filler surrounding the protuberances and occupying the spaces therebetween, and a seat having an orifice smaller than the body together with its protuberances, whereby the protuberances may contact the seat and prevent passage of the body through the orifice, and the filler may seal between the body and the seat through being deformed by fluid pressure in the housing.

7. A hydraulic mechanism including: two valve elements composed of a rigid valve head and a rigid orificed seat therefor, one of the elements having rigid knobby protuberances for contacting the other element and preventing passage of the head through the orifice; and, a resilient filler surrounding the protuberances and filling the spaces therebetween, said filler deformable by fluid pressure for sealing between the head and the seat.

8. In a hydraulic mechanism consisting of two elements of a rigid material between which a fluid under pressure may pass, means for sealing between the elements for preventing passage of the fluid, including: Rigid knobby protuberances carried by one of the elements for contact with the other element to limit proximity of the two; and, a resilient filler surrounding the protuberances and filling the spaces therebetween, said filler deformable by fluid pressure for sealing between the adjacent faces of the two elements.

9. A hydraulic mechanism including: two elements consisting of an orificed valve seat of rigid construction, and a movable closure for the orifice of the seat, said closure also being of rigid construction; rigid knobby protuberances carried by one element and contacting the other during operation for preventing passage of the closure through the orifice; and, a resilient filler surrounding the protuberances and filling the spaces therebetween, said filler being deformable by fluid pressure for sealing around the protuberances and between the closure and the seat.

10. In a valve structure, a valve head, comprising a body of rigid material, an orificed seat for the same, spaced rigid knobby projections carried by the body and having together with the body a span greater than the orifice of the seat, and a resilient filler surrounding the projections and occupying the spaces therebetween, said projections adapted to contact the seat when the body is in a closed position.

11. A valve head comprising, a body of rigid material, spaced rigid projections carried by the body and having their free ends describing an arc, said projections adapted to contact a valve seat for limiting proximity of the body and seat, and a resilient cover for the body deformable by fluid pressure, said cover surrounding the projections, occupying the spaces therebetween, and having its exterior surface arcuately formed.

PHILIP M. REA.